E. C. SHAW.
POWER PULLEY FOR VEHICLE WHEELS.
APPLICATION FILED JULY 7, 1919.
1,372,836. Patented Mar. 29, 1921.
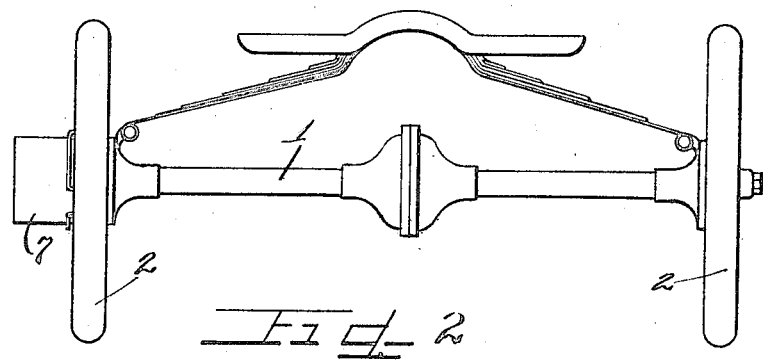
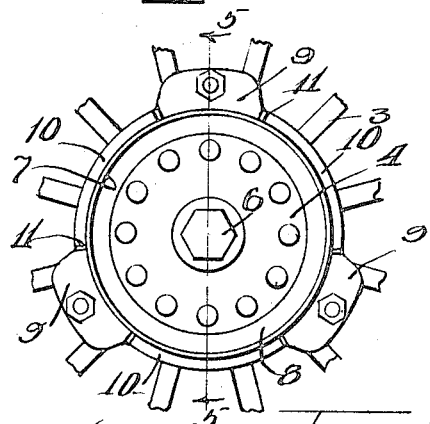
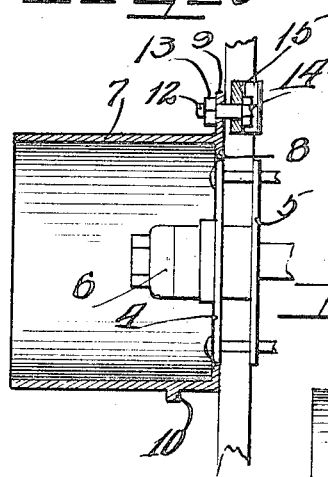
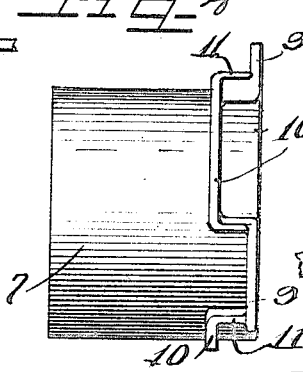
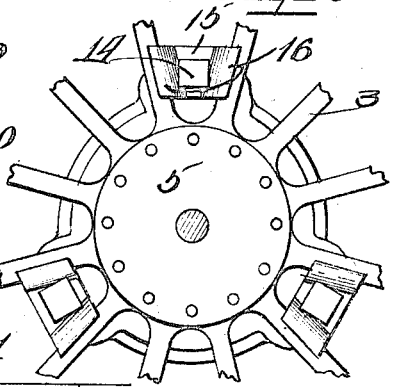

UNITED STATES PATENT OFFICE.

EDWARD C. SHAW, OF GALESBURG, ILLINOIS, ASSIGNOR TO SHAW, WELSH & COMPANY, OF GALESBURG, ILLINOIS, A CORPORATION OF ILLINOIS.

POWER-PULLEY FOR VEHICLE-WHEELS.

1,372,836.

Specification of Letters Patent.  Patented Mar. 29, 1921.

Application filed July 7, 1919. Serial No. 309,012.

*To all whom it may concern:*

Be it known that I, EDWARD C. SHAW, a citizen of the United States, and a resident of the city of Galesburg, in the county of Knox and State of Illinois, have invented certain new and useful Improvements in Power-Pulleys for Vehicle-Wheels; and I do hereby declare that the following is a full, clear, and exact description of the same, reference being had to the accompanying drawings, and to the numerals of reference marked thereon, which form a part of this specification.

This invention relates to a power pulley which may be readily attached to any standard type of artillery wheel with the attaching mechanism conveniently accessible from the exterior of the device.

Furthermore, the device is so constructed that it may be readily attached in place and centered upon the wheel without necessitating preliminary adjustments or removal of any parts whatsoever of the wheel itself.

It is an object, therefore, of this invention to construct a power pulley adapted to be readily attached to the wheel of an automobile or other vehicle to utilize the power transmitted to said wheel at said pulley for any purpose whatsoever.

It is also an object of this invention to construct a power pulley adapted to be fitted over the hub of a vehicle wheel and readily attached thereto, for receiving a driving belt or other means trained thereabout, and provided with a guard to prevent interference of said belt or means with the attaching mechanism of the pulley upon the wheel.

It is finally an object of this invention to construct a simple, cheap and durable device readily adaptable for the purpose intended and convenient for use at any time without hindering the function of the wheel of the vehicle in its usual mode of operation even when left attached thereon.

Other and further important objects of this invention will be apparent from the disclosures in the specification and drawings.

The invention (in a preferred form) is illustrated in the drawings and hereinafter more fully described.

On the drawings:

Figure 1 is a fragmentary rear view of the rear axle and wheel of a standard type of motor car with a device embodying the principles of my invention attached to one of the wheels thereof.

Fig. 2 is a fragmentary front face view of the hub of the wheel having the device embodying the principles of my invention attached in position thereon.

Fig. 3 is a similar rear face view of the wheel showing the device in attached position.

Fig. 4 is a side elevation of the device detached from the wheel and with the attaching means omitted.

Fig. 5 is a central vertical section with parts in elevation taken on line 5—5 of Fig. 2.

As shown on the drawings:

The reference numeral 1, indicates as a whole the rear axle of a motor car and journaled on the ends thereof are the usual wooden artillery wheels 2. In the particular adaptation of the wheel and power pulley assembly shown, I have illustrated a wheel having twelve spokes denoted by the reference numerals 3, an outer hub plate 4, and an inner hub plate 5, with the hub closure or cap on the end of the wheel and axle denoted by the reference numeral 6.

The device embodying the principles of my invention consists of a cylindrical pulley 7, having an inwardly extending flange 8, at its inner end adapted to fit snugly around the periphery of the outer hub plate 4 of the wheel, and thereby centering the pulley for attachment to the wheel. Said cylindrical pulley is also provided with extending flanges or attaching plates 9, which are flush with the end of the pulley, and are shown three in number, but, of course, the number may vary as desired according to the particular wheel to which the device is attached and the amount of power transmitted. Integrally formed upon the cylindrical surface of the pulley 7, and extending between the flange portions 9, are outwardly extending peripherally disposed ribs or flanges 10. These ribs at their ends each terminate in an integral inwardly directed rib 11, which merges into and is flush with the edges of the flange plates 9.

Each of said flange plates 9 is apertured to receive an attaching bolt 12, therethrough with a nut denoted by the reference numeral 12, and seated against the outer surface of the flange plate 9. The head of each of said bolts 12, is denoted by the reference numeral 14, and is seated in a spoke clamping claw 15, which is apertured to receive the bolt 12 therethrough. Each of said clamping claws 15, is provided with two convergent curved wing extensions 16 shaped to fit around the spokes of a wheel, as clearly shown in Fig. 3. The angular relation between the convergent curved extensions 16, of course, depends upon the angular relation of the spokes of the wheel but this is a known quantity for wheels of a given number of spokes.

The operation is as follows:

In attaching the power pulley to the wheel of the motor car, each of the bolts 12 is detached from the flange plates 9, and the power pulley is centered over the outer hub plate 4 of the wheel. Each of the bolts 12 is then inserted through its respective clamping claw 15, and is brought into register on the rear surface of the wheel between a pair of spokes with a flanged plate 9 and inserted therethrough. The nuts 13 are then engaged on the bolts and as the nuts are drawn up, the power pulley 7 is gradually tightened upon the wheel, being centralized by the outer hub plate 4.

Owing to the fact that the nuts 13 for each of said bolts 12 are seated in recesses, as shown in Figs. 2 and 4, between the terminating ends 11, of the guide ribs 10, all of said nuts 13 are conveniently accessible. The driving effect from the wheel to the power pulley is transmitted largely along the surface of frictional contact between the flanged surfaces of said pulley and the surface of contact thereof with the wheel, and also, of course, through the bolts and clamping claws by which the pulley is attached upon the wheel. The bolts 12 are prevented from turning in the claw elements 15 when the nuts 13 are drawn up owing to the fact that the squared heads 14 of each of said bolts is seated between the convergent curved wing extensions 16. The attachment of the power pulley 7 upon the wheel of the motor car does not in any way interfere with the operation of the motor car and the same may be driven about as usual and the power pulley 7 only utilized when desired. Of course, it is susceptible of many uses, for instance to receive a belt thereon to drive another piece of machinery, or to receive a rope coiled therearound to utilize the pulley as a windlass either in hauling the motor car out of a hole or up a steep incline. In either event, the peripheral guide or guard ribs 10, prevent the belt, rope, or other means trained about the pulley from traveling inwardly toward the wheel and becoming entangled with the attaching bolts.

I am aware that numerous details of construction may be varied through a wide range without departing from the principles of this invention, and I therefore do not purpose limiting the patent granted otherwise than necessitated by the prior art.

I claim as my invention:

In a device of the class described, the combination with a motor vehicle wheel having a circular hub plate, of a pulley having an interior flange adapted to surround said plate for centering said pulley, said pulley having a belt guard flange, said guard flange being offset at intervals to provide securing flanges, and means for detachably securing said flanges to the spokes of said wheel.

In testimony whereof I have hereunto subscribed my name in the presence of two subscribing witnesses.

EDWARD C. SHAW.

Witnesses:
 EARL M. HARDINE,
 CHARLES W. HILLS, Jr.